(12) United States Patent
Blum et al.

(10) Patent No.: US 11,619,938 B2
(45) Date of Patent: Apr. 4, 2023

(54) AUTONOMOUS TRANSPORTATION TECHNIQUES

(71) Applicant: Universal City Studios LLC, Universal City, CA (US)

(72) Inventors: Steven C. Blum, Orlando, FL (US); Justin M. Schwartz, Orlando, FL (US); Christopher Oliver, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 349 days.

(21) Appl. No.: 16/130,709

(22) Filed: Sep. 13, 2018

(65) Prior Publication Data

US 2019/0079521 A1 Mar. 14, 2019

Related U.S. Application Data

(60) Provisional application No. 62/558,749, filed on Sep. 14, 2017.

(51) Int. Cl.
*G05D 1/00* (2006.01)
*G06K 9/00* (2022.01)
(Continued)

(52) U.S. Cl.
CPC .......... *G05D 1/0088* (2013.01); *A63G 25/00* (2013.01); *A63G 31/00* (2013.01); *G05D 1/0027* (2013.01);
(Continued)

(58) Field of Classification Search
CPC .............. G05D 1/0088; G05D 1/0027; G05D 2201/0212; A63G 25/00; A63G 31/00; G06K 9/00838; G06Q 10/02; G06Q 50/30

See application file for complete search history.

(56) References Cited

U.S. PATENT DOCUMENTS

| 8,769,393 B1 | 7/2014 | Abhyanker |
| 9,084,941 B1 | 7/2015 | Fram |
| 9,436,183 B2 | 9/2016 | Thakur et al. |

(Continued)

FOREIGN PATENT DOCUMENTS

| DE | 102015118662 A1 | 5/2017 |
| JP | 2002011254 A | 1/2002 |

(Continued)

OTHER PUBLICATIONS

PCT/US2018/050923 International Search Report and Written Opinion dated Nov. 21, 2018.
JP Office Action For Japanese Office Action dated Jul. 4, 2022, 4 Pages.

*Primary Examiner* — Faris S Almatrahi
*Assistant Examiner* — Sahar Motazedi
(74) *Attorney, Agent, or Firm* — Fletcher Yoder P.C.

(57) ABSTRACT

An amusement park attraction system includes a plurality of autonomous vehicles configured to accommodate one or more guests and located in an attraction dispatch area. An individual autonomous vehicle includes a vehicle controller including a memory storing instructions and a processor configured to execute the instructions, the instructions configured to cause the vehicle controller to receive an indication that the individual autonomous vehicle is loaded at capacity within the dispatch area and drive autonomous operation of the individual autonomous vehicle from the dispatch area to enter the ride path.

14 Claims, 7 Drawing Sheets

(51) Int. Cl.
  *G06Q 10/02* (2012.01)
  *G06Q 50/30* (2012.01)
  *A63G 25/00* (2006.01)
  *A63G 31/00* (2006.01)
  *G06V 20/59* (2022.01)

(52) U.S. Cl.
  CPC ............. *G06Q 10/02* (2013.01); *G06Q 50/30* (2013.01); *G06V 20/593* (2022.01); *G05D 2201/0212* (2013.01)

(56) References Cited

U.S. PATENT DOCUMENTS

| | | | |
|---|---|---|---|
| 9,443,207 | B2 | 9/2016 | Przybylko et al. |
| 9,451,020 | B2 | 9/2016 | Liu et al. |
| 9,508,260 | B2 | 11/2016 | Shaik |
| 9,534,906 | B2 | 1/2017 | High et al. |
| 9,547,986 | B1 | 1/2017 | Curlander et al. |
| 9,720,410 | B2 | 8/2017 | Fairfield et al. |
| 9,733,096 | B2 | 8/2017 | Colijn et al. |
| 9,739,226 | B2 | 8/2017 | Elwart et al. |
| 10,527,428 | B1* | 1/2020 | Mehta ................... G06Q 10/08 |
| 2007/0156758 | A1 | 7/2007 | Aidiga |
| 2014/0111332 | A1 | 4/2014 | Przybylko et al. |
| 2014/0129074 | A1* | 5/2014 | Boshears ............. G05D 1/0297 701/25 |
| 2015/0149265 | A1 | 5/2015 | Huntzicker et al. |
| 2015/0226146 | A1 | 8/2015 | Elwart et al. |
| 2015/0248131 | A1 | 9/2015 | Fairfield et al. |
| 2015/0338852 | A1 | 11/2015 | Ramanujam |
| 2015/0346727 | A1 | 12/2015 | Ramanujam |
| 2015/0356665 | A1 | 12/2015 | Colson et al. |
| 2016/0021178 | A1 | 1/2016 | Liu et al. |
| 2016/0125736 | A1 | 5/2016 | Shaik |
| 2016/0209842 | A1 | 7/2016 | Thakur et al. |
| 2016/0255969 | A1 | 9/2016 | High et al. |
| 2016/0273922 | A1 | 9/2016 | Stefan |
| 2016/0370194 | A1 | 12/2016 | Colijn et al. |
| 2017/0021282 | A1 | 1/2017 | Comploi |
| 2017/0075357 | A1 | 3/2017 | MacNeille et al. |
| 2017/0148316 | A1 | 5/2017 | Curlander et al. |
| 2017/0213308 | A1 | 7/2017 | Wellborne et al. |
| 2017/0213403 | A1 | 7/2017 | Diehl et al. |
| 2017/0219362 | A1 | 8/2017 | Bryson et al. |
| 2017/0242433 | A1 | 8/2017 | Ochiai et al. |
| 2017/0267233 | A1 | 9/2017 | Minster et al. |
| 2017/0270794 | A1 | 9/2017 | Sweeney |
| 2017/0329332 | A1* | 11/2017 | Pilarski ............. B60W 30/0956 |
| 2018/0283896 | A1 | 10/2018 | Piemonte et al. |
| 2019/0137290 | A1* | 5/2019 | Levy .................. G01C 21/3461 |

FOREIGN PATENT DOCUMENTS

| | | |
|---|---|---|
| JP | 2016027456 A | 2/2016 |
| WO | 17117246 A1 | 7/2017 |

\* cited by examiner

AUTONOMOUS TRANSPORTATION TECHNIQUES

CROSS-REFERENCE TO RELATED APPLICATIONS

This application claims priority from and the benefit of U.S. Provisional Application No. 62/558,749, entitled "AUTONOMOUS TRANSPORTATION TECHNIQUES," filed Sep. 14, 2017, which is hereby incorporated by reference in its entirety for all purposes.

FIELD OF DISCLOSURE

The present disclosure relates generally to autonomous transportation techniques. More specifically, embodiments of the present disclosure relate to systems and methods for autonomous transportation of guests and materials within an entertainment site.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks or similar entertainment facilities may move people and goods in a variety of ways within a park environment that is closed to outside vehicle traffic. However, vehicle transportation within a park is complex. Pedestrian paths are often closed to motor vehicles. Park shuttles may operate on set paths within the park, but these may require guests to wait for the next shuttle. Further, guests often have overnight accommodations that are outside of park boundaries, which discourages back-and-forth trips to drop off unneeded items.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, an amusement park attraction system is provided that includes a ride path of an amusement park attraction and an attraction dispatch area separated from the ride path. The system also includes a plurality of autonomous vehicles configured to accommodate one or more guests and located in the attraction dispatch area. The individual autonomous vehicle includes a vehicle controller including a memory storing instructions and a processor configured to execute the instructions, the instructions configured to cause the vehicle controller to: receive an indication that the individual autonomous vehicle is loaded at capacity within the dispatch area; and drive autonomous operation of the individual autonomous vehicle from the dispatch area to enter the ride path.

In accordance with another embodiment, an amusement park transportation system is provided that includes an autonomous vehicle, wherein the autonomous vehicle is configured to accommodate one or more guests; and a controller configured to communicate with the autonomous vehicle. The controller includes a memory storing instructions and a processor configured to execute the instructions, the instructions configured to cause the controller to: access a reservation or a return time of a guest for an attraction in an amusement park; determine or access a location of the guest within a predetermined time window preceding the reservation or the return time; provide instructions to the autonomous vehicle to go to the location; provide an alert to a guest device related to the autonomous vehicle; receive an indication from the autonomous vehicle that the guest is on or in the autonomous vehicle; and provide instructions to the autonomous vehicle to travel to the attraction with the guest after receiving the indication.

In accordance with another embodiment, an amusement park transportation system is provided that includes an autonomous vehicle holding personal belongings of a guest, and a controller configured to communicate with the autonomous vehicle, wherein the controller comprises a memory storing instructions and a processor configured to execute the instructions. The instructions configured to cause the controller to receive a request from the guest for the personal belongings; determine or access a location of the guest; provide instructions to the autonomous vehicle to go to the location; provide an alert to the guest related to the autonomous vehicle; and receive an indication that the guest has retrieved the personal belongings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
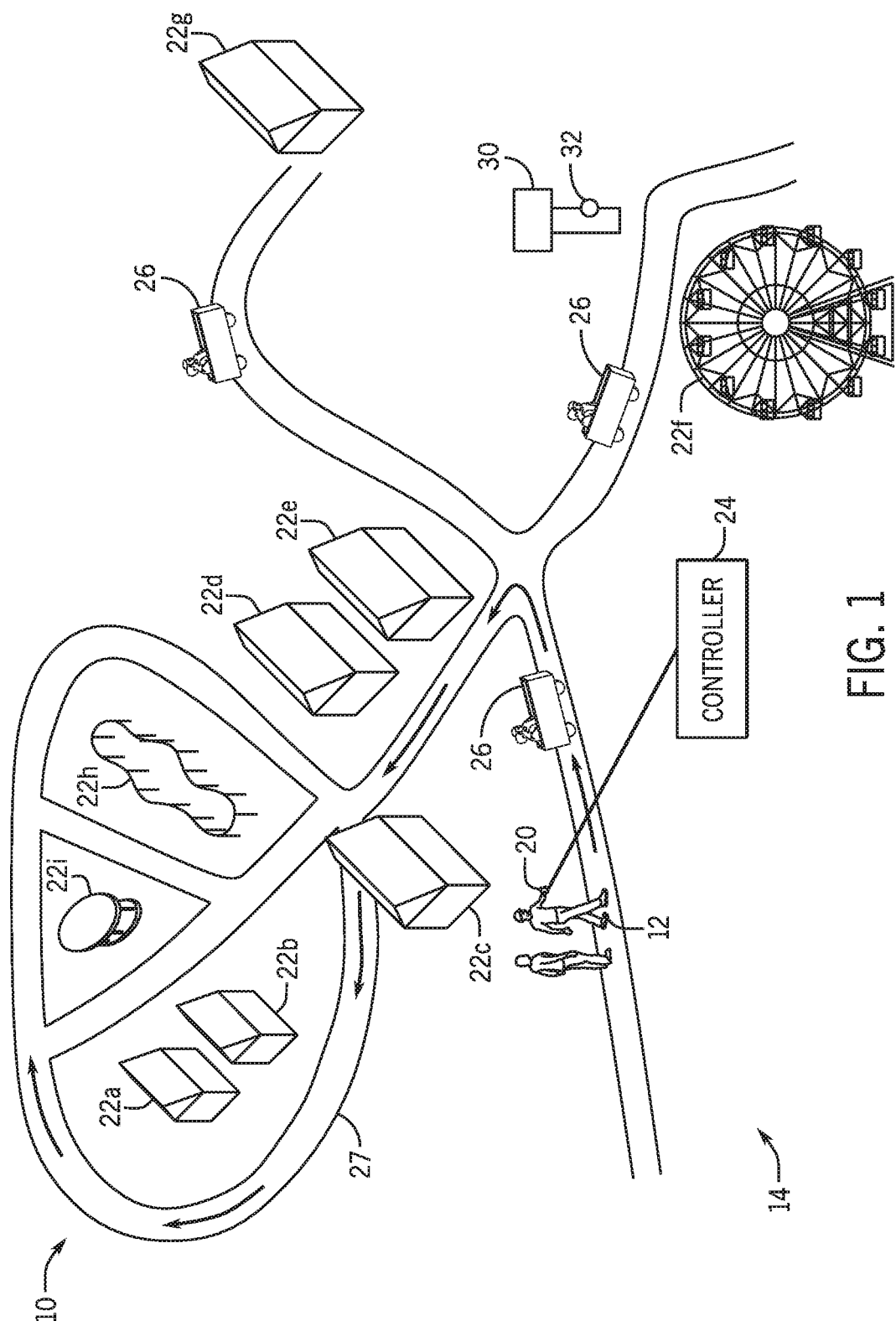
FIG. 1 is a schematic diagram of an amusement park including an autonomous vehicle transportation system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

Provided herein is an autonomous vehicle transportation system whereby guests at numerous locations distributed across a resort or area are permitted access to transportation system boarding points, the boarding points having interactive devices functionally similar to elevator call buttons providing input(s) to a control system that dispatches an autonomous vehicle to the boarding points where the guests are picked up. Individual autonomous vehicles may also be implemented with input devices on board that allow guests to select a destination and be taken there in two/three dimensional elevator model. Requests may be from call buttons or a device in a fixed location or via a personal or distributed mobile device. Accordingly, as provided herein, autonomous vehicles may be used to transport guests within an area such as an amusement park that is generally closed to outside vehicle traffic. In contrast to autonomous or semi-autonomous vehicles that travel on roads open to the general public, transportation within a closed area such as a theme park may operate according to different considerations. In particular, such closed areas are generally limited in size and relatively well mapped, which may permit less complex processing and navigation capabilities resident on the autonomous vehicle. Further, such vehicles may operate according to a mix of predetermined rules-based action, e.g., based on a desired amusement narrative and path, and user-driven actions, which may permit destination selection and/or input to the path traveled by the autonomous vehicle.

In another embodiment, according to the disclosed techniques, autonomous vehicles are configured to travel directly to the user location in a passive or active manner. In one example, when a guest has a reservation or return time, the guest location is tracked as they engage in other entertainment opportunities. The autonomous vehicle arrives at the guest location in advance (e.g., within a predetermined time window before the guest's turn to ride the ride comes up), whether or not the guest has requested vehicle transportation. In one embodiment, these autonomous vehicles may be themed ride vehicles that are themed to match the ride for which the guest has the reservation or return time. In this manner, the guest may easily distinguish an assigned autonomous vehicle from other autonomous vehicles. The system may provide alerts or messages to the user reminding them that an autonomous vehicle is en route to their current location or en route to one or more fixed pickup locations designated for autonomous vehicle pickup. Further, themed ride vehicles may be distributed throughout the park and may be programmed, once boarded, to only go to a ride or land area associated with the theme of the vehicle. By way of example, when a guest sees a farm animal-themed vehicle, the guest may board any such vehicle to be transported to a petting zoo area of the amusement park without providing any user input or instructions.

The present techniques provide an autonomous vehicle that may travel along a predetermined or partially predetermined path from pickup point to delivery point and that may interact with sets, scenery, and mechanized equipment according to a guest experience delivery plan or a stored guest profile. The interaction may include dynamic interaction with show systems mounted on similar autonomous transport material handling devices. The autonomous vehicle transportation system may be instructed to encounter show or interactive equipment that may also be autonomously driven.

In other embodiments, the autonomous vehicle transportation system may also be configured to operate as a three-dimensional dumb waiter (delivers merchandise to guest rooms, for example) or a traveling locker that arrives to collect (and later re-deliver) personal belongings to guests e.g., based on a request from a mobile device or call station.

In other embodiments, the autonomous vehicle transportation system may also be configured to operate individual autonomous vehicles as a universal ride vehicle that is capable of transporting guests between rides and also serving as the ride vehicle itself, such that guests need not load or unload from the vehicle between rides. The autonomous vehicle may advantageously support passengers when configured as a ride and/or guest transportation vehicle. In certain embodiments, the autonomous vehicle may be additionally or alternatively be a deployable and/or dockable towing element, the latter being advantageous, for example, when the passenger compartment must be subject to significant track mounted motion base loads that the towing unit need not be subject to.

In other embodiments, the autonomous vehicle transportation system may be configured as a distributed station system that facilitates guest loading and unloading for an amusement ride. Such an embodiment may be implemented with autonomous ride vehicles that are at least partially untethered from the ride environment at the loading/unloading stage, whereby the autonomous ride vehicles may roam the loading area and/or a wider park area to seek guests until each vehicle is at capacity. In another embodiment, the autonomous ride vehicles are stationed at one or more loading areas separated from the ride itself. Once loaded to capacity, each autonomous ride vehicle may enter the ride path, such that each vehicle within the ride is loaded in a more efficient manner in contrast to a first-in/first-out traditional loading system. Further, such an embodiment may be implemented in a variety of spaces and areas, providing flexibility in ride design to permit relatively smaller ride footprints and lower ride infrastructure costs.

In other embodiments the autonomous vehicle transportation system may be configured to automatically configure and remove props for special events and shows. For example, the autonomous vehicle may be recruited for assembling a temporary stage and then striking same for a street show. Each autonomous and independent vehicle allows for dynamic reconfiguration such that failed show equipment or failed ride vehicles can be navigated around, including the movement of show equipment out of the way. Ride vehicle intelligence may reside on the ride vehicle, and not necessarily on a master controller. The autonomous vehicle may be able to make intelligent decisions on its own based on onboard sensors. However, in certain embodiments, ride vehicle instructions may be provided from a central controller.

To that end, the features of an autonomous transportation system as provided herein may be used in conjunction with the disclosed embodiments. FIG. 1 is a schematic view of an amusement park 10 in which a guest 12 is capable of interacting with an autonomous vehicle transportation system 14, e.g., via interacting with a guest device 20, e.g., a mobile device or an active wearable device (bracelet, watch, etc.). The amusement park 10 includes a number of destinations or attractions 22 (shown as 22a-i). If the guest 12 is interested in transportation to a particular attraction 22, the guest 12 may request transportation e.g., via a request entered on the guest device interface. In certain embodiments, the guest device 20 may include an application or specialty software package for interaction with a controller 24. The application is stored on the guest device 20 and is configured to receive information from the controller 24 to provide to the guest 12. In addition, the application is configured to provide user inputs and other information (e.g., GPS data) to controller 24 as appropriate.

The controller 24 is in communication with one or more autonomous vehicles 26 (e.g., as part of an autonomous vehicle fleet) that are distributed throughout the amusement park 10 and that are capable of traveling along paths 27 within the amusement park 10. Based on user input or a user schedule and a guest location, the controller 24 may instruct an individual vehicle 26 to go to the user location and pick up the user. The autonomous vehicle transportation system 14 may also include vehicle call stations 30, e.g., with call buttons 32 or other user input devices.

Figure 2:
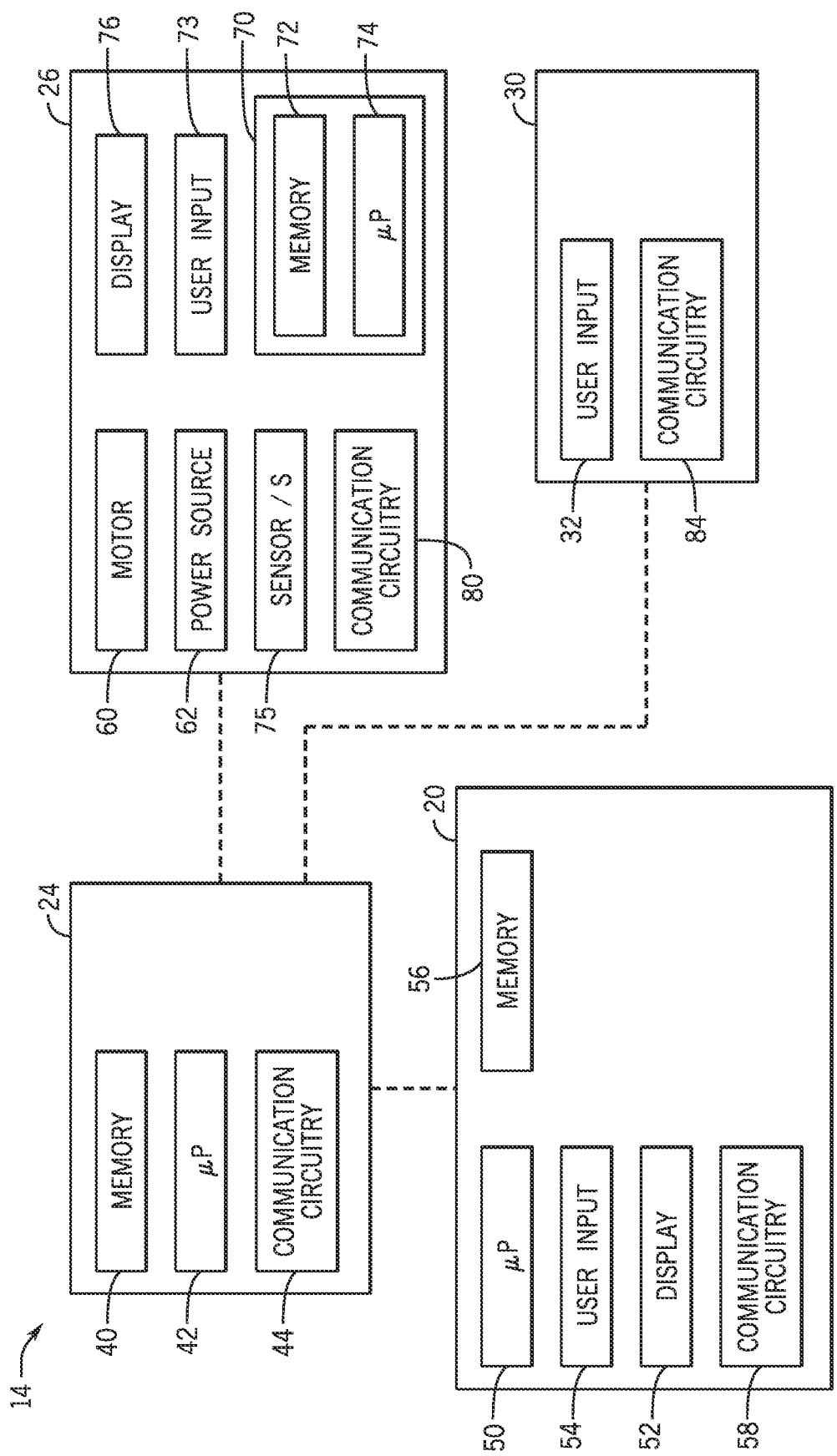
FIG. 2 is a block diagram of components of an autonomous vehicle transportation system, in accordance with an aspect of the present disclosure.

FIG. 2 is a block diagram of certain components of the autonomous vehicle transportation system 14. It should be understood that the illustrated components may have additional software or hardware elements. Further, the functionality of various disclosed hardware or software elements may be duplicated and/or exchanged in the illustrated components.

The system 14 may be configured to operate at least in part via instructions from the controller 24, which may include a memory 40 for storing instructions executable by a processor 42 to perform the methods and control actions described herein. The processor 42 may include one or more processing devices, and the memory 40 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 42 or by a special purpose or programmed computer or other machine with a processor. In addition, the controller 24 may be configured to include communication circuitry 44, e.g., a transceiver or other communications devices to communicate over wired and wireless communication paths with one or more other components of the system 14.

In one embodiment, communication between the controller 24 and the guest device 20 occurs at least in part via a wireless network. While these components are discussed in the context of the system 14, it should be understood that the guest device 20 may also include similar features, such as a processor 50, display 52, user input 54, memory 56, and wireless communication circuitry 58. In one embodiment, the guest device 20 interacts with the system via operation of application stored on the guest mobile device 20 and in communication with the system 14 that may include a navigation or guidance feature that allows a user to select an attraction 22 and summon or request autonomous vehicle transport. Further, the guest device 20 may be configured to provide user location information (e.g., GPS information accessed from a GPS chip of the guest device 20 or user location determined by cellular base station communication). The user location information 64 may include tracked location information as the user moves throughout the amusement park. In certain embodiments, the autonomous vehicle transportation system 14 is configured to request periodic location updates (e.g., every 10 seconds). In some embodiments, the guest device 20 may automatically provide the user location information. In one embodiment, the guest location information may be determined based on multiple location data sources. For example, GPS information may provide a rough estimate of guest location, while finer location information may be estimated from one or more of LIDAR or facial recognition via image sensors within the park 10.

As discussed, the autonomous vehicle transportation system 14 may include one or more autonomous vehicles 26 that includes a display 76, a motor 60 and a power source 62, e.g., a battery, a solar panel, an electrical generator, a gas engine, or any combination thereof. The operations of the motor 60 may be controlled by a vehicle controller 70 including a memory 72 and a processor 74 and configured to operate any on-board logic to control vehicle paths or progress. For example, the vehicle may respond to local environmental input via one or more on-board sensors 75. The vehicle controller 70 may control the motor 60 to adjust its output power to accelerate or decelerate the vehicle 26. The vehicle controller 70 may also control a brake to decelerate or stop the vehicle 26. Further, the vehicle controller 70 may operate under instructions from the rider via a user input interface or user input 73 or from the controller 24, via communications circuitry 80. In certain embodiments, the autonomous vehicle 26 may be an autonomous mobile robot that is configured with a customized or interchangeable top module. Accordingly, the top module may be exchanged depending on the implementation of the autonomous vehicle 26. For example, when the autonomous vehicle 26 is provided as a personal locker or roaming dumb waiter, the top module may include one or more lockers keyed to a guest identification signal. The autonomous vehicle 26 may store image and/or navigation files of the amusement park 10 in the memory 72 such that navigation may be executed using the processor 74 of the vehicle controller 70 to execute on-board logic. The sensors 75 may include one or more cameras, laser scanners, and/or ultrasonic scanners that provide inputs to the vehicle controller 70 to execute turns or navigation instructions to avoid obstacles. Further, the sensors 75 may include one or more readers configured to receive biometric input (e.g., a fingerprint, facial image) or a wireless signal from the guest device 20 to confirm the presence of a guest 12 and/or to provide guest verification data. In certain embodiments, the autonomous vehicle 26 may receive a guest identification code or guest identification information that may in turn be passed to the controller 24 to verify that the guest on-board the autonomous vehicle 26 is the correct guest. Upon verification, the controller 24 may send an authorization/verification signal that permits the autonomous vehicle 26 to continue on a route.

In addition, the autonomous vehicle transportation system 14 may include one or more call stations 30 that may facilitate user input via a call button or other user input device 32 that, in turn, is communicated to the controller 24 via communications circuitry 84 to call a vehicle 26 to the fixed location of the call station 30.

Figure 3:
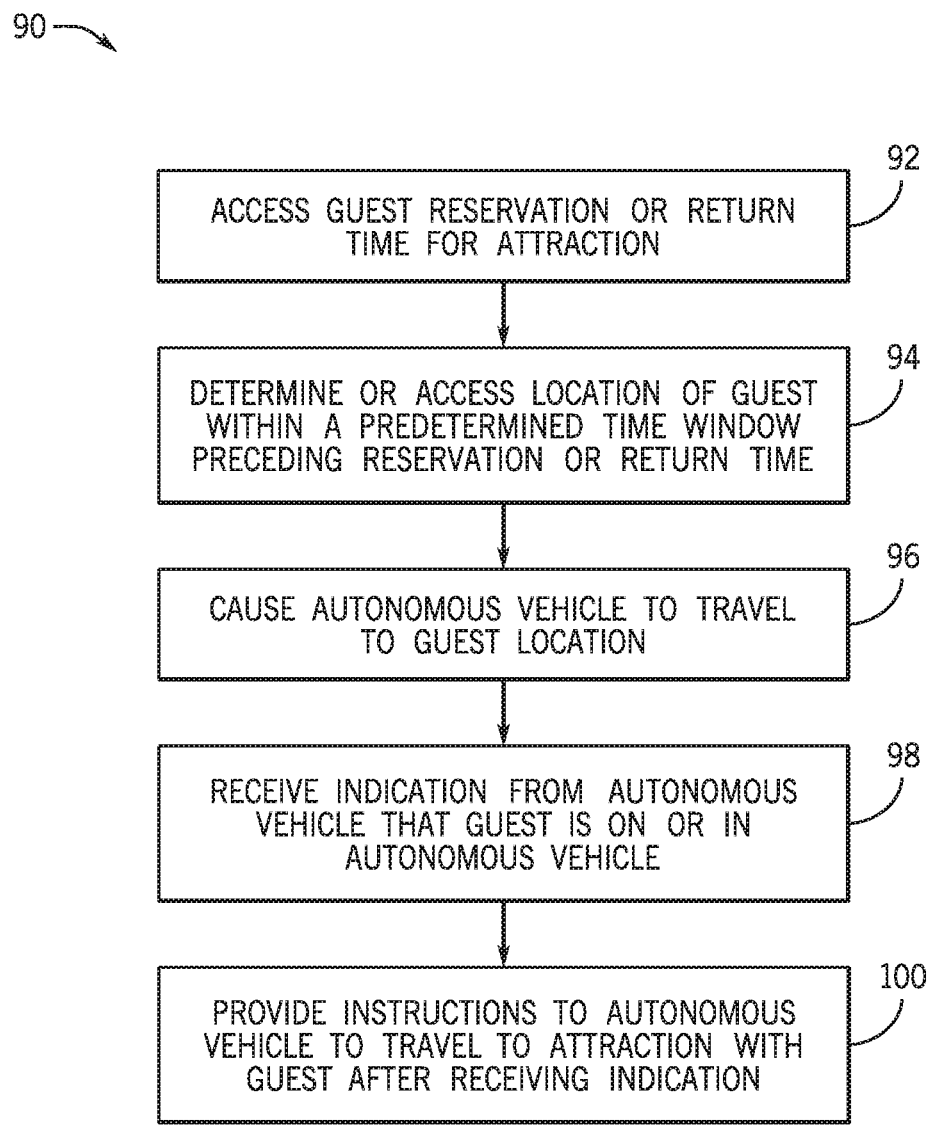
FIG. 3 is a flow diagram of an autonomous vehicle guest transportation technique, in accordance with an aspect of the present disclosure.

FIG. 3 is a flow diagram illustrating an embodiment of a method 90 of an autonomous vehicle guest transportation technique. In the illustrated embodiment, the method 90 accesses a guest reservation or return time for a particular attraction 22 (see FIG. 1) at block 92. The reservation or return time may be stored in the controller (e.g., controller 24, see FIG. 2), which in turn is in communication with various components of the autonomous vehicle transportation system 14 (see FIG. 2). When the reservation or return time is within a particular time window (e.g., 45 minutes from the return time, 15 minutes from the return time), the guest location is determined or accessed at block 94. In one embodiment, if the guest is using a guest device 20 (see FIG. 2) to interact with the system 14, GPS information is pulled from a GPS chip of the guest device 20. However, in certain embodiments, the GPS information provides a rough estimate of guest location, and other techniques are used in addition to GPS to more accurately pinpoint the guest location, such as wireless beacon triangulation with the guest device 20, facial recognition date from the park, light detection and ranging (LIDAR), etc. Upon guest location determination, an autonomous vehicle is dispatched to the guest location at block 96. Because guests may be on the move, an indication may be send from the controller 24 to the guest device 20 to alert the guest that transportation is en route and to suggest a pickup location. In one embodiment, the autonomous vehicle is dispatched automatically in a passive manner based on an existing reservation or return time for an attraction and based on guest location, such that the guest need not arrange for transportation. However, if the guest is determined to be within a distance threshold of the attraction 22 determined to be relatively close to the attraction (e.g., within 200 feet or less), the controller 24 may not dispatch the autonomous vehicle. Further, the guest may receive the alert and decline the offer of transportation. The controller 24 may be in communication with a fleet of autonomous vehicle within the park and may dispatch the closest available vehicle. In another embodiment, the controller 24 selects an autonomous vehicle to travel to the guest for transport that is thematically matched to the attraction 22 in question such that the guest is able to easily spot the autonomous vehicle.

After the guest has boarded the autonomous vehicle (block 98), the system 14 receives an indication that the guest is in or on the autonomous vehicle. The indication may be via an on-board sensor of the autonomous vehicle (pressure/weight sensor, camera, optical sensor) or via a communication between a guest device 20 of the guest and wireless communication circuitry of the autonomous vehicle, e.g., via an NFC communication that sends guest identification information to the controller 24 to perform a guest verification. Once the guest is confirmed to be boarded, the system 14 instructs the autonomous vehicle to travel to the attraction 22 at block 100. In certain embodiments, the system 14 may update the existing reservation or return time based on the autonomous vehicle's progress towards the attraction 22. If the autonomous vehicle is delayed, the existing reservation or return time is updated to reflect a later estimated arrival of the guest.

Figure 4:
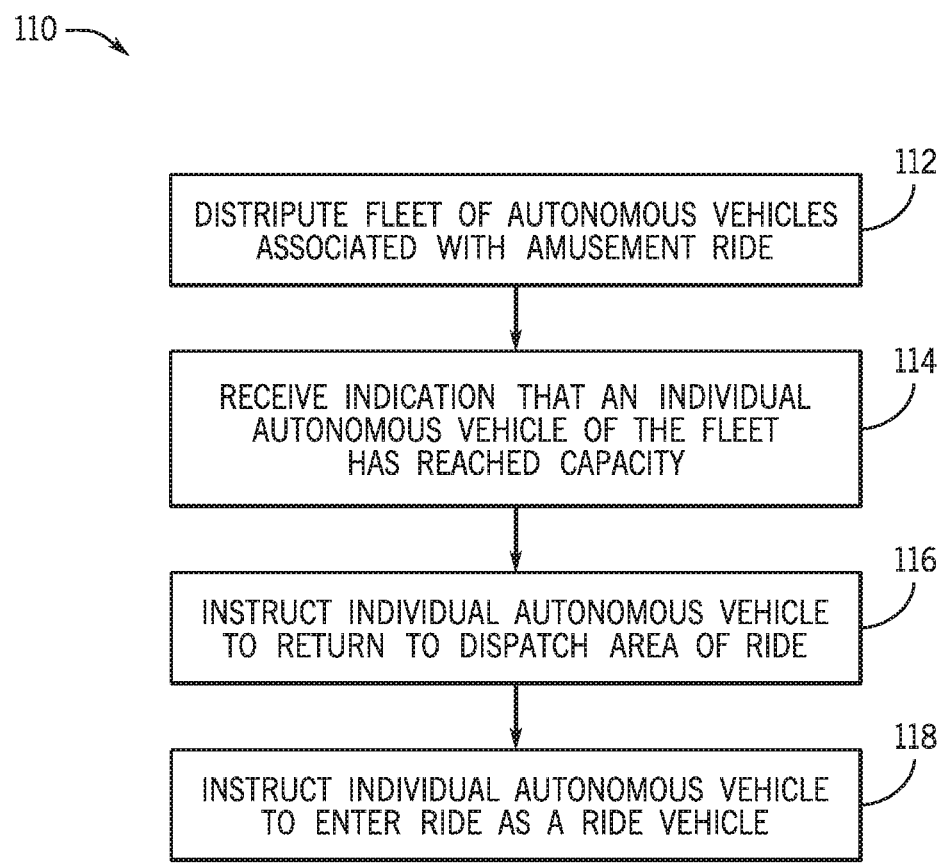
FIG. 4 is a flow diagram of an autonomous vehicle attraction loading technique, in accordance with an aspect of the present disclosure.

FIG. 4 is a flow diagram illustrating an embodiment of a method 110 of an autonomous vehicle attraction loading technique, e.g., for an amusement park ride. A fleet of autonomous vehicles is distributed throughout an area (block 112), such as throughout an amusement park or throughout a dispatch area of an attraction. The autonomous vehicles collect guests that are seeking to enter the attraction from the area and, once an individual autonomous vehicle provides an indication to the system 14 (e.g., to the controller 24, see FIG. 2) indicating being filled or at capacity (114) with guests, the individual autonomous vehicle is instructed to either return to the dispatch area of the ride (block 116) and eventually enter the attraction or ride as a ride vehicle (block 118). In this manner, one or more autonomous ride vehicles may roam an area of the amusement park seeking guests for an attraction. For example, if an attraction is underserved, the autonomous ride vehicles may serve to recruit guests to the attraction.

Figure 5:
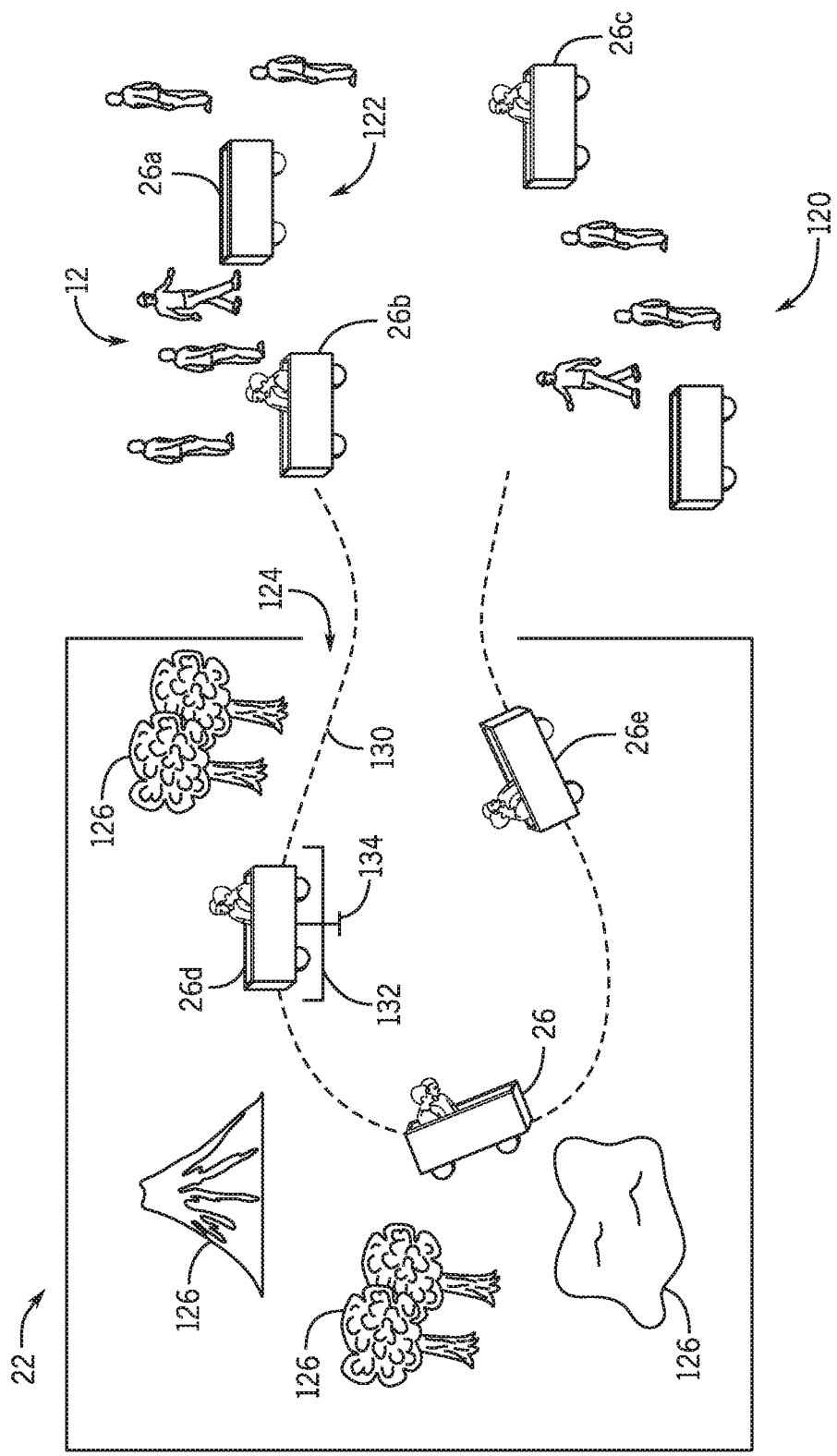
FIG. 5 is a schematic diagram of an amusement park attraction operating with an autonomous vehicle attraction loading technique, in accordance with an aspect of the present disclosure.

In another embodiment, one or more autonomous vehicles may operate within a dispatch area of an attraction to facilitate more efficient guest loading. For example, one or more autonomous vehicles may be implemented as autonomous ride vehicles that operate according to on-board logic to travel between a guest loading area and an attraction. FIG. 5 is a schematic diagram of an amusement park attraction 22 operating with an autonomous vehicle attraction loading technique. Guests 12 enter the attraction 22 via a dispatch area 120 from which guests 12 are loaded/unloaded into autonomous vehicles 26. The dispatch area 120 may correspond to a ride queuing area with pre-show elements and in which guests 12 are permitted to move freely. In contrast to typical ride loading scheme in which guests enter ride vehicles in a first-in/first-out basis at a point of entry to the ride, in the depicted embodiment, the autonomous vehicles 26 are untethered from or spaced apart from a ride entry location 124.

For example, the autonomous vehicles 26 may either be roaming or distributed throughout the dispatch area 120 or generally located at a vehicle parking area 122 in the dispatch area 120. The guests 12 are free to board an individual autonomous vehicle 26 within the dispatch area 120 without necessarily waiting in a queue. In this manner, a greater number of guests 12 are able to board the autonomous vehicles 26 simultaneously and from both sides, which may be more challenging in a traditional loading scheme. Further, such an arrangement may increase guests comfort and enjoyment, permitting guests 12 to enjoy pre-attraction elements in a manner of their choosing. In one embodiment, the guests 12 traverse the dispatch area 120 at their own pace, and walk to the parking area 122 when ready to board an autonomous vehicle 26. In another embodiment, guests 12 traverse the dispatch area 120 and board a nearest autonomous vehicle 26 at their leisure. The autonomous vehicles 26 may operate according to on-board logic that encourages vehicle distribution within the dispatch area. For example, an individual autonomous vehicle 26 may traverse the dispatch area 120 and may only be permitted to park and wait for guest boarding at a location that is spaced apart a minimum distance (e.g., at least 10 feet) from other autonomous vehicles 26. In this manner, autonomous vehicles 26 are programmed to be distributed throughout the dispatch area, which prevents guest congestion during boarding.

The vehicles 26, once loaded at capacity, are programmed to travel autonomously along an adaptive path (i.e., using on-board control logic to avoid dynamic obstacles such as guests 12 or other vehicles 26) to the ride entry location 124 to enter the attraction 22. For example, as depicted, an autonomous vehicle 26b loaded at capacity travels directly from the dispatch area 120 into the attraction 22, serving as both transportation to the attraction 22 as well as the ride vehicle itself. Further, the on-board control logic and/or a central controller (e.g., controller 24, see FIG. 2) may adjust a vehicle capacity threshold depending on a ride status. If the attraction 22 is relatively empty with few waiting guests 12, the autonomous vehicles 26 may be dispatched to ride entry 124 when only half full, e.g., at less than 100% capacity. In another embodiment, the autonomous vehicles 26 may be programmed to generally enter the ride path 130 via the ride entry 124 at a relatively steady rate to achieve a particular throughput of vehicles and/or guests 12. Accordingly, a rules-based determination of a next-vehicle-to-send may be performed in which distance to the ride entry and loading percentage (guests 12 already on board as a percentage of available seats on an individual autonomous vehicle 26) are weighted to determine which vehicle is dispatched next to the ride entry 124. In another embodiment, to encourage guest loading into autonomous vehicles that are not loaded to capacity, the autonomous vehicles 26 may display an indication of available seats.

Within the ride environment 125 of the attraction 22, one or more ride elements 126 may be distributed along a ride path 130. The autonomous vehicles 26 may be generally programmed to travel along the ride path 130. However, the on-board control logic may permit deviations from the ride path 130 as generally discussed in FIGS. 6-7. The autonomous vehicles 26 may be programmed to interface with certain features of the ride path 130, e.g., special effects locations 132. In one example, a special effects location 132 may lock onto a vehicle feature 134 of an individual autonomous vehicle 26d to facilitate motion effects at a predetermined location in the ride environment 125. In this manner, the trackless autonomous vehicle 26 may be configured to create certain motion effects. Once the ride path 130 is complete, an individual autonomous vehicle 26, e.g., autonomous vehicle 26e, exits the ride environment of the attraction 22 and re-enters the dispatch area 120 to being loading new guests 12.

As noted, the autonomous vehicles 26 may permit dynamic and adaptive transportation within an amusement park and within the attractions to avoid obstacles, permit more efficient maintenance, and to vary a ride experience. For example, the disclosed autonomous vehicles 26 may permit ride paths to flow in and out of more controlled ride environments as desired. In this manner, a ride experience may extend to one or more locations within the amusement park before returning to a more-controlled traditional ride environment. Further, even within a ride environment, a ride path may be adjusted based on changing ride conditions.

Figure 6:
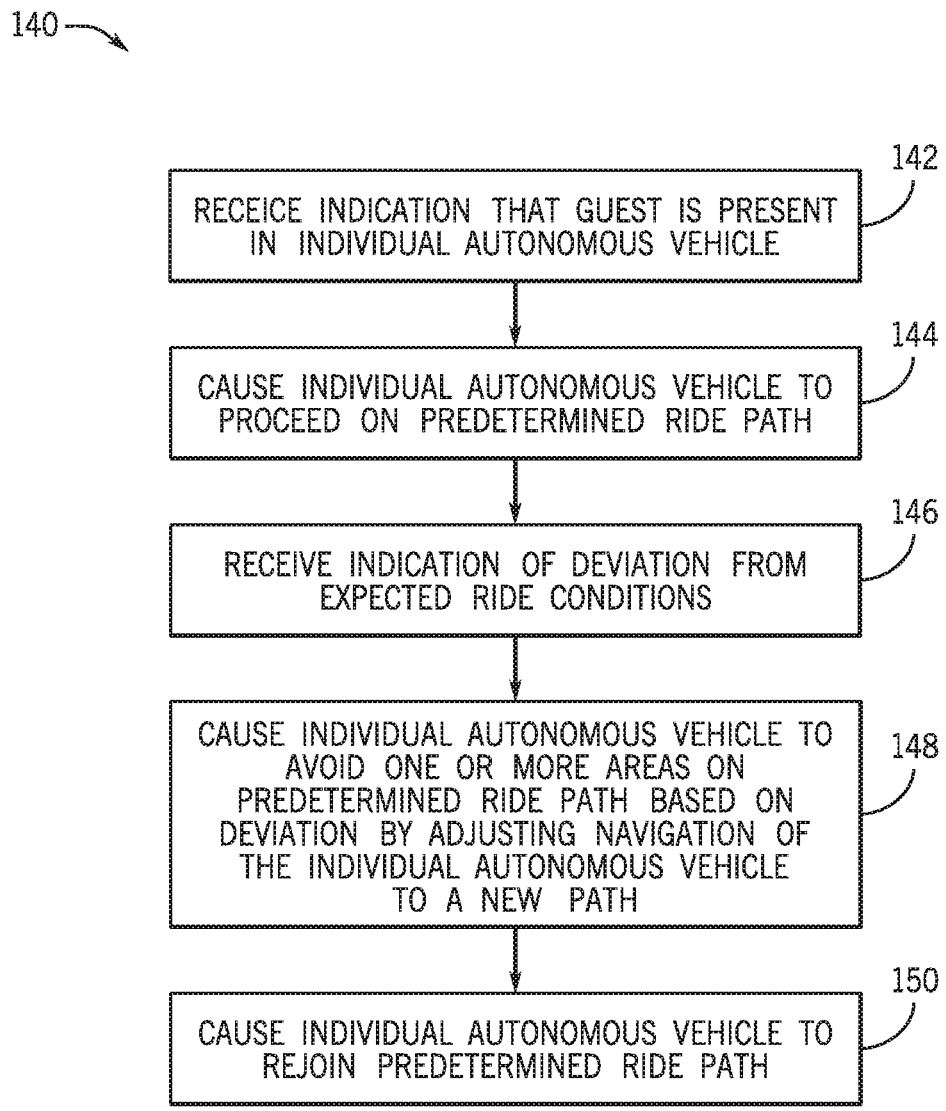
FIG. 6 is a flow diagram of an attraction autonomous vehicle adaptive path technique, in accordance with an aspect of the present disclosure.

FIG. 6 is a flow diagram of an attraction autonomous vehicle adaptive path method 140 implemented within an attraction. In the depicted embodiment related to guest transport, the method 140 initiates when the guest is present in an individual autonomous vehicle (block 142), e.g., as determined by sensors or other guest tracking features, which in turn triggers the autonomous vehicle to proceed on a predetermined ride path within the attraction (block 144). However, it should be understood that the autonomous vehicles 26 as provided herein may travel on adaptive paths regardless of whether guests are on board. Within the attraction, an existing change in status, such as a vehicle malfunction, attraction element malfunction, congestion at a particular location, may trigger a determination of a deviation from expected ride conditions. Upon receiving the indication (block 146), one or more autonomous vehicles 26 within the attraction are caused to avoid the areas associated with the deviation by adjusting navigation onto pa new path (block 148). The new path may rejoin with the predetermined ride path (block 150) once the deviation has been successfully avoided.

The autonomous vehicles disclosed herein are capable of dynamically adjusting to changing ride conditions or edge cases, such as vehicle breakdowns. For example, a vehicle malfunction for a track-based ride or trackless rides that operate with conventional vehicles may interrupt the entire ride when the broken vehicle clogs the track or space. Autonomous vehicles implemented as ride vehicles as provided herein are capable of moving around obstacles such that ride breakdowns will affect fewer total vehicles. Because the control logic is on the autonomous vehicle, the autonomous vehicle responds to obstacles in real time. For example, the autonomous vehicle deviates from a path to move around another stalled vehicle. In another example, a misbehaving guest that has wandered into the ride path does not cause the entire ride to shut down, because the autonomous vehicle can move around the guest.

Figure 7:
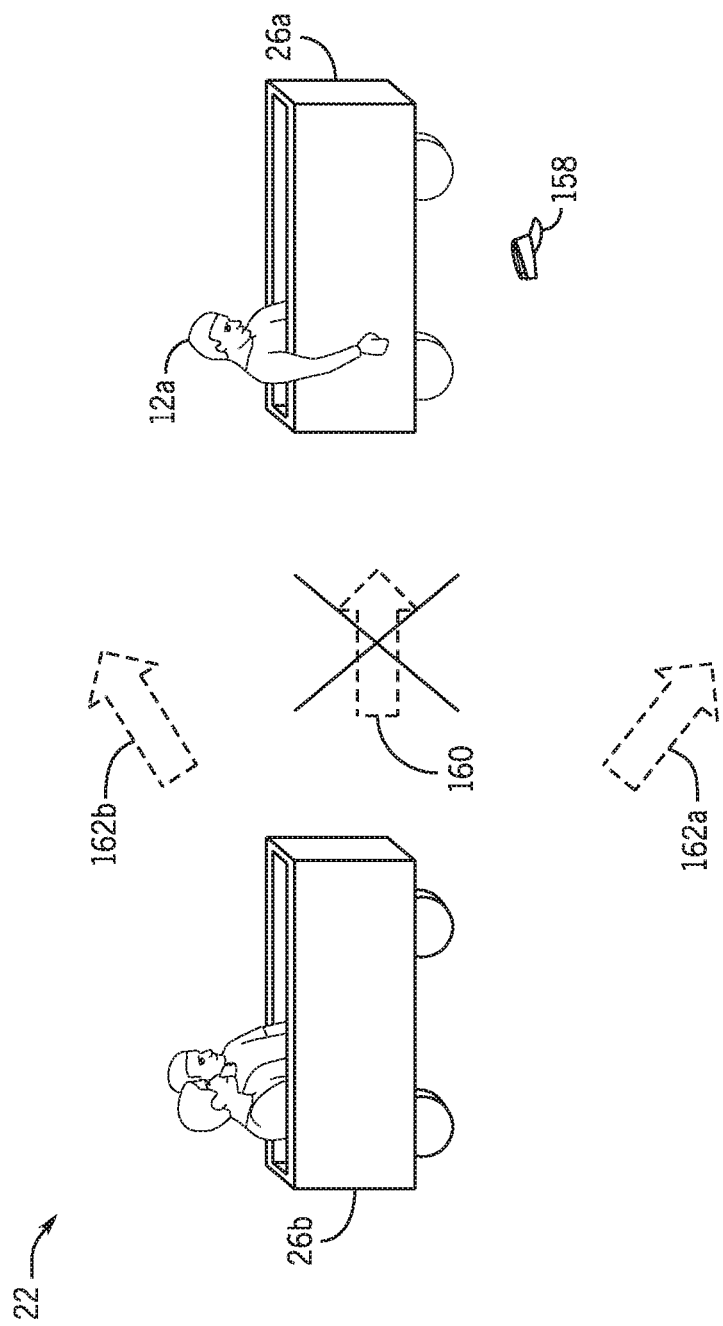
FIG. 7 is a schematic diagram of an amusement park attraction operating with an autonomous vehicle adaptive path technique, in accordance with an aspect of the present disclosure.

In one example, the vehicles generally follow a predetermined path, but are capable of operating around edge cases (broken vehicles, obstacles) As provided herein, the autonomous vehicles 26 may be implemented as smart vehicles within the attraction 22 and the ride environment 158. FIG. 7 is a schematic diagram of an amusement park attraction operating with an autonomous vehicle adaptive path technique. In the depicted example, a guest 12a in an autonomous vehicle 26a has inadvertently dropped an object 158 outside of the autonomous vehicle 26a into the ride environment, which in certain rides would cause a ride delay by stopping the entire ride as an operator clears the ride environment of the obstacle created by the object 158. However, in the depicted embodiment, the autonomous vehicles 26 behind the obstacles 158, e.g., the autonomous vehicle 26b, dynamically adjust away from the predetermined path, indicated by arrow 160, to pursue an alternate path, depicted by arrows 162a, 162b.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. An amusement park attraction system, comprising:
a ride path of an attraction;
a dispatch area of the attraction separated from the ride path;
a plurality of autonomous vehicles configured to accommodate one or more guests and located in the dispatch area, wherein an individual autonomous vehicle of the plurality of autonomous vehicles comprises:
a vehicle controller comprising a memory storing instructions and a processor configured to execute the instructions, the instructions configured to cause the vehicle controller to:

drive autonomous operation of the individual autonomous vehicle within the dispatch area to load the one or more guests;

generate an indication that the individual autonomous vehicle is loaded at capacity within the dispatch area;

send the indication to a central controller; and drive autonomous operation of the individual autonomous vehicle from the dispatch area to enter the ride path based on the indication, wherein the vehicle controller of the individual autonomous vehicle is configured to cause the individual autonomous vehicle to roam within the dispatch area until generating the indication and wherein the instructions further cause the vehicle controller of the individual autonomous vehicle to receive a signal that the attraction is underserved and, upon receiving the signal, drive autonomous operation of the individual autonomous vehicle to areas outside of the attraction to load one or more guests from the areas outside of the attraction and to return to the dispatch area when the individual autonomous vehicle is loaded with the one or more guests from the areas outside of the attraction.

2. The system of claim 1, wherein the vehicle controller of the individual autonomous vehicle is configured to cause the individual autonomous vehicle to travel along an adaptive path to enter the ride path, wherein the adaptive path is adapted to avoid dynamic obstacles.

3. The system of claim 1, wherein the vehicle controller of the individual autonomous vehicle is configured to cause the individual autonomous vehicle to be spaced a predetermined distance apart from other autonomous vehicles of the plurality of autonomous vehicles within the dispatch area until generating the indication.

4. The system of claim 1, wherein the ride path is a predetermined path within a ride environment, and wherein the dispatch area is outside of the ride environment.

5. The system of claim 1, wherein the indication that the individual autonomous vehicle is loaded at capacity is based on a status or throughput of the attraction.

6. The system of claim 1, wherein the vehicle controller of the individual autonomous vehicle is configured to cause the individual autonomous vehicle to travel an adaptive path to the dispatch area subsequent to traversing the ride path of the attraction.

7. The system of claim 1, wherein the vehicle controller of the individual autonomous vehicle is configured to cause the individual autonomous vehicle to travel to the dispatch area subsequent to traversing the ride path of the attraction.

8. The system of claim 1, wherein the vehicle controller of the individual autonomous vehicle is configured to cause the individual autonomous vehicle to travel an adaptive path within the attraction.

9. The system of claim 1, wherein the vehicle controller of the individual autonomous vehicle is configured to identify a vehicle malfunction of the individual autonomous vehicle and cause the individual autonomous vehicle to exit the ride path.

10. The system of claim 1, wherein the vehicle controller of the individual autonomous vehicle is configured to identify one or more obstacles along the ride path and cause the individual autonomous vehicle to temporarily exit the ride path to avoid the one or more obstacles.

11. The system of claim 1, wherein the vehicle controller of the individual autonomous vehicle is configured to cause the individual autonomous vehicle to travel to a location on the ride path to cause one or more features of the attraction to interface with one or more complementary features of the individual autonomous vehicle.

12. The system of claim 1, wherein a vehicle capacity threshold is adjusted based on a ride status.

13. The system of claim 1, wherein the vehicle controller of the individual autonomous vehicle is configured to:
determine that the individual autonomous vehicle is loaded at capacity based on a signal from one or more on-board sensors of the individual autonomous vehicle, the signal being indicative of a presence of the one or more guests; and generate the indication based on the determination.

14. The system of claim 13, wherein the one or more on-board sensors comprises a pressure sensor, a weight sensor, an optical sensor, a camera, or a combination thereof.

* * * * *